G. G. LOBDELL.
Car-Wheel.

No. 164,570.

2 Sheets--Sheet 1.

Patented June 15, 1875.

Witnesses,
Harry Smith
Thomas McIlvain

George G. Lobdell
By his attys.
Howson & Son

2 Sheets--Sheet 2.
G. G. LOBDELL.
Car-Wheel.
No. 164,570.        Patented June 15, 1875.
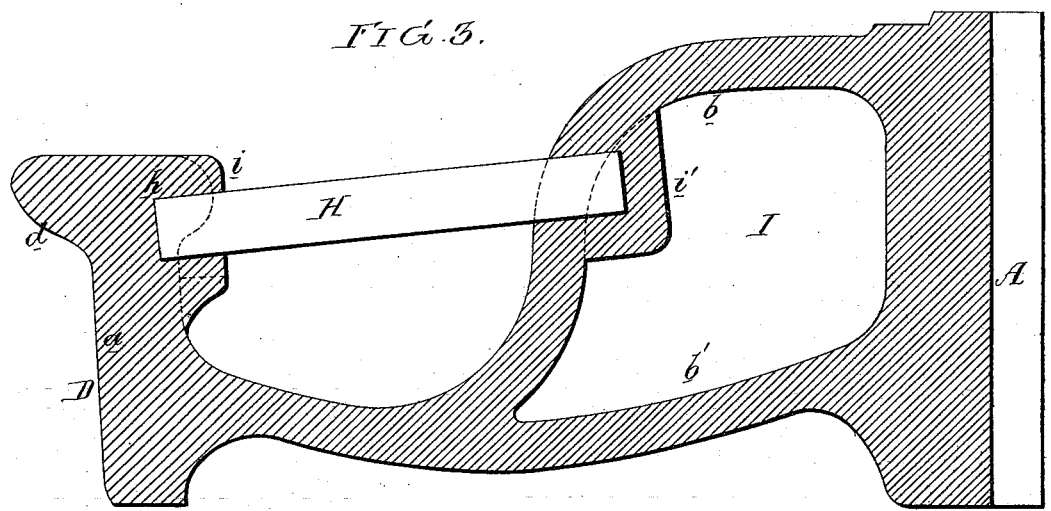
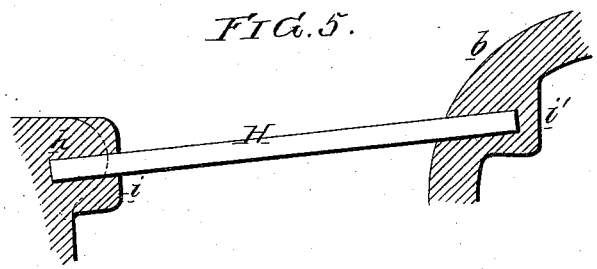
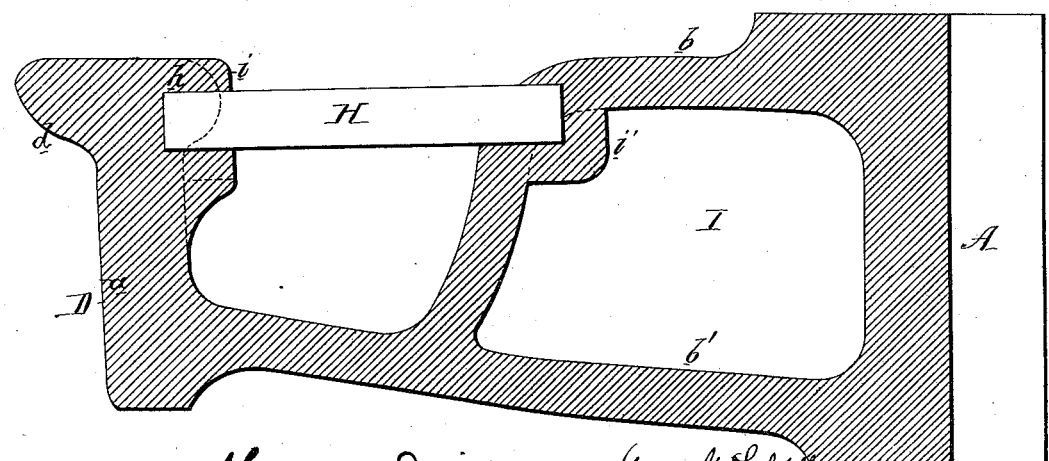

UNITED STATES PATENT OFFICE.

GEORGE G. LOBDELL, OF WILMINGTON, DELAWARE.

IMPROVEMENT IN CAR-WHEELS.

Specification forming part of Letters Patent No. 164,570, dated June 15, 1875; application filed May 25, 1875.

*To all whom it may concern:*

Be it known that I, GEORGE G. LOBDELL, of Wilmington, New Castle county, State of Delaware, have invented certain Improvements in Car-Wheels, of which the following is a specification:

My invention relates to an improvement in cast-iron car-wheels, in which the webs are made hollow near the hubs; and the object of my invention is to so combine radial rods or plates of wrought iron or steel with a wheel of this class that all its advantages will be retained and its objectionable features obviated.

Figure 1:
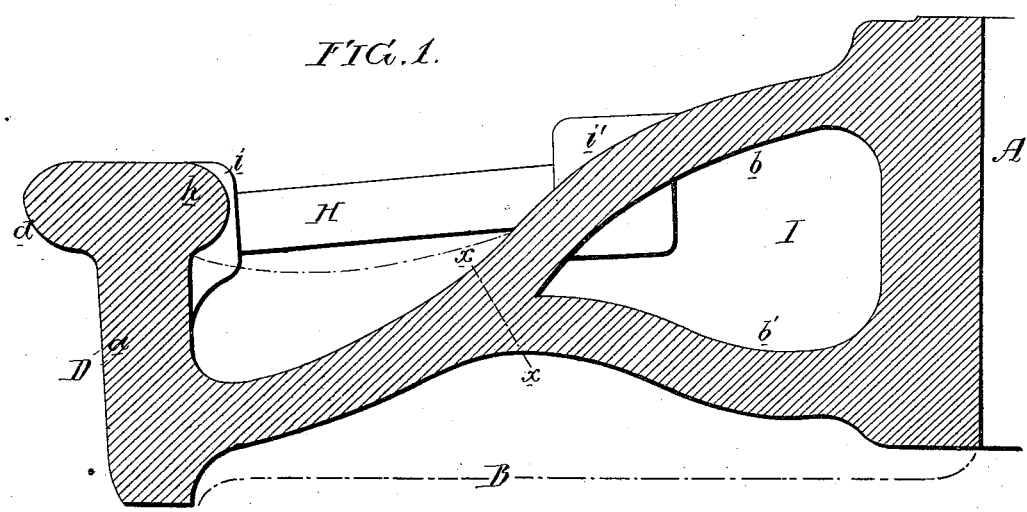
Figure 2:
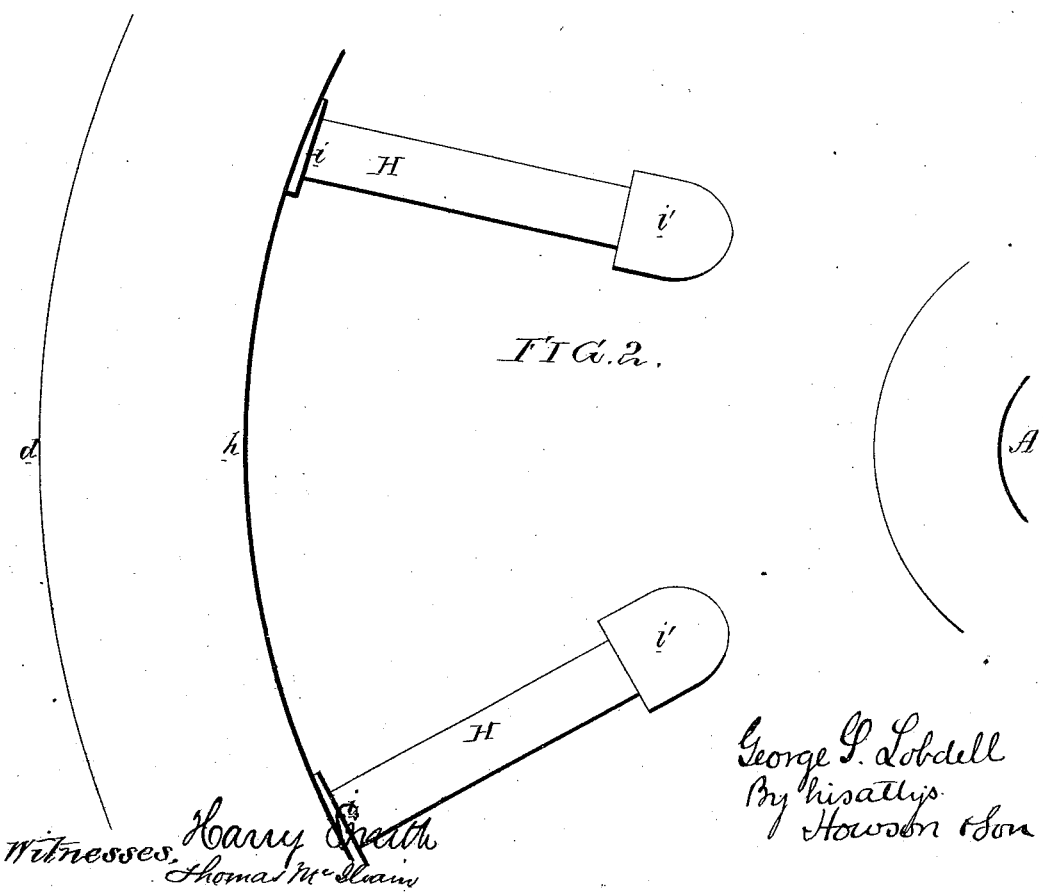

In the accompanying drawing, Figure 1, Sheet 1, is a sectional view of sufficient of the wheel to illustrate my invention; Fig. 2, a plan view of part of the wheel. Figs. 3 and 4, Sheet 2, show my invention as applied to wheels differing somewhat in shape from that illustrated in Sheet 1, and Fig. 5 a view showing a modification of my invention.

In Sheet 1, A is the hub of the wheel; B, the web, and D the rim, the web consisting partly of a single plate and partly of a double plate, the single plate extending from the rim to the dotted line $x\ x$, where it merges into the two plates $b$ and $b'$, the latter diverging from the said line, and extending to the hub A, and constituting the hollow portion I of the web. Wheels of this class—generally termed hollow-hubbed wheels—have long been in use and favorably known for the great strength and comparative lightness attributable to the said hollow portion I of the web. The rim D, as far as regards the tread $a$ and flange $d$, is of the usual form, the internal rib $h$ described in the Letters Patent granted to me on the 12th day of January, 1869, being, by preference, added, partly with the view of re-enforcing the rim, and partly for the purpose of insuring a perfect chill, as set forth in the said patent. It has been usual in making wheels of this class to cast on them a series of radial ribs indicated by dotted lines, thereby strengthening that portion of the web which consists of a single plate, and effecting a substantial union of the rib with the web. The objection to these ribs, however, is this: that they are apt to cool after the metal is poured into the mold fastest at and near their outer edges, and this tends to impair the integrity of the wheel. I discard these radial ribs and connect the rim of the wheel to the hollow portion of the web by a series of wrought-iron or steel rods or braces, H, which are secured in their places during the process of casting the wheel. Wherever one of these braces occurs the rim of the wheel has a boss or enlargement, $i$, for receiving one end of the brace, and a like boss, $i'$, is formed on the hollow portion of the web for receiving the opposite end of the brace.

In the patent for a car-wheel granted to George W. Eddy, January 8, 1850, radial braces of wrought-iron extend from the rim to the hub of the wheel; hence I make no broad claim for such braces. My invention, in fact, is an improvement in that described in the said patent of Eddy.

Instead of extending the braces H from the rim D directly to the hub, I connect their inner ends to the strongest portion of the wheel—that is, to the hollow portion I of the web—the latter being better adapted to resist the end strains to which the braces are subjected than the hub itself. In other words, my improved wheel possesses the well-known advantage of a hollow web near the hub, and the additional strength imparted by the radial braces, while the main objection to wheels of this class—namely, the radial ribs, which, as before remarked, detract from the integrity of the wheel—is obviated.

In Sheet 2, Figs. 3 and 4 show wheels in which the hollow portions I are of a shape differing from that shown in Sheet 1; and Fig. 5 is a section showing how a wrought-iron or steel plate may be substituted for the rods.

I claim as my invention—

The within-described car-wheel, in which are combined the hollow portion I of the web, the rim D, and radial braces H, or a plate of wrought iron or steel, attached to the rim, and hollow portion I of the web, all as set forth.

In testimony whereof I have signed my name to this specification in the presence of two subscribing witnesses.

GEORGE G. LOBDELL.

Witnesses:
HARRY SMITH,
HUBERT HOWSON.